United States Patent [19]

Ichie

[11] Patent Number: 5,583,342
[45] Date of Patent: Dec. 10, 1996

[54] LASER SCANNING OPTICAL SYSTEM AND LASER SCANNING OPTICAL APPARATUS

[75] Inventor: Koji Ichie, Hamamatsu, Japan

[73] Assignee: Hamamatsu Photonics K.K., Hamamatsu, Japan

[21] Appl. No.: 525,419

[22] Filed: Sep. 7, 1995

Related U.S. Application Data

[63] Continuation of Ser. No. 252,789, Jun. 2, 1994, abandoned.

[30]   Foreign Application Priority Data

Jun. 3, 1993 [JP] Japan ................................. 5-133659
Apr. 28, 1994 [JP] Japan ................................. 6-091551

[51] Int. Cl.$^6$ .................................................. G01N 21/64
[52] U.S. Cl. ................................ 250/459.1; 250/458.1; 359/196
[58] Field of Search .......................... 359/196, 213–215, 359/221; 250/458.1, 461.1, 461.2, 459.1; 356/317, 318, 417

[56]   References Cited

U.S. PATENT DOCUMENTS

| | | | |
|---|---|---|---|
| 2,759,393 | 8/1956 | McLeod. | |
| 3,999,855 | 12/1976 | Hirschfeld | 250/574 |
| 4,179,708 | 12/1979 | Sheng et al. . | |
| 4,623,776 | 11/1986 | Buchroeder et al. | 359/618 |
| 4,887,592 | 12/1989 | Loertscher | 128/395 |
| 5,034,613 | 7/1991 | Denk et al. | 250/458.1 |
| 5,080,456 | 1/1992 | Katz et al. | 359/214 |

FOREIGN PATENT DOCUMENTS 0430183  11/1990  European Pat. Off. .
2247605  10/1990  Japan .

OTHER PUBLICATIONS

Rioux et al., "Linear, Annular, and Radial Focusing with Axicons and Applications to Laser Machining", Applied Optics, 17(10), May 15, 1978, pp. 1532–1536.
Arimoto et al., Imaging Properties of Axicon In A Scanning Optical System, Applied Optics, vol. 31, No. 31, pp. 6653–6657, 1 Nov. 1992, New York, U.S.
Tanaka et al., "Generation of Bessel–Beam, Spot by an Axicon Prism:", Proceedings 10th Meeting, Japan Society for Laser Micorscopy, Tsukuba, Japan Nov. 27, 1992.
Denk et al, "Two–Photon Laser Scanning Fluorescence Microscopy", Science, vol. 248, Apr. 6, 1990, pp. 73–76.

*Primary Examiner*—Carolyn E. Fields
*Attorney, Agent, or Firm*—Cushman Darby & Cushman, L.L.P.

[57]   ABSTRACT

A laser scanning optical system is so arranged to comprise an optical converting unit, an optical scanning unit, and an optical converging unit. Here, the optical converting unit is composed of two axicon prisms which are arranged such that apexes thereof are opposed forward or backward to each other at a predetermined distance and optical axes thereof are coincident with each other and which are made of respective materials having a same refractive index and shaped with a same apical angle. By this, the laser beam incident into the optical converting unit becomes a cylindrical ray bundle having an annular cross-sectional intensity perpendicular to the optical axis. Therefore, the cylindrical ray bundle is changed in the traveling direction by the optical scanning unit to be scanned and is then converged by the optical converging unit to become a Bessel beam having a high energy utilization factor, a high resolution and a long focal depth.

4 Claims, 11 Drawing Sheets

LASER SCANNING OPTICAL SYSTEM AND LASER SCANNING OPTICAL APPARATUS

This is a continuation of application Ser. No. 08/252,789, filed on Jun. 2, 1994, which was abandoned.

BACKGROUND OF THE INVENTION

1. Field of the Invention

The present invention relates to a laser scanning optical system and a laser scaning optical apparatus for performing scanning of laser beam, used in various fields, for example in biology, in medicine, in semiconductor engineering, as a fluorescence microscope, an optical writing apparatus, and as an IC repair apparatus.

2. Related Background Art

If an ordinary fluorescence microscope is used to observe a sample having a three-dimensional thickness, defocused images outside the depth of focus are superimposed on an image formed on the focal plane. This globally lowers the contrast of microscopic image, which makes determination of fluorescence intensity difficult. Approaches to deal with this problem will be described in the following.

For example, in a conventional confocal laser scanning fluorescence microscope, a laser beam emitted from a laser is expanded in diameter of its ray bundle by a beam expander and thereafter passes through a dichroic mirror. The laser oscillates the laser beam at a wavelength corresponding to a peak wavelength in an absorption spectrum of a fluorescent dye used in labeling of a sample. The beam expander is composed of two convex lenses. The dichroic mirror is so formed as to have a high reflectivity for optical components in a predetermined wavelength range including a fluorescence emitted from the fluorescent dye and a high transmittance for the oscillation wavelength of the laser beam.

The laser beam is bent in the direction perpendicular to the optical axis by an X-Y scanner and is focused by an imaging lens to form an optical spot on a front image plane of an objective lens, and thereafter the objective lens converges the optical spot to the diffraction limit to form a converged optical spot inside the sample. The X-Y scanner changes the traveling direction of laser beam within a predetermined angular range to scan in two orthogonal directions on a plane. Further, the objective lens or a stage on which the sample is set moves in parallel with the optical axis. Thus, the optical spot of the laser beam three-dimensionally scans the inside of sample by parallel scanning to the optical axis in addition to the two-dimensional scanning perpendicular to the optical axis, such as raster scanning. The sample is, for example, an organism sample labeled with a fluorescent dye, which is excited by the optical spot of the laser beam.

A fluorescence diverging out of the sample is collected by the objective lens and thereafter advances backward through the optical path, through which the laser beam has passed. The fluorescence outgoing from the X-Y scanner is reflected by the dichroic mirror in the direction perpendicular to the optical axis and thereafter is focused by a collimator lens to form an image thereof in a pinhole in a confocal pinhole plate. The fluorescence outgoing from the confocal pinhole plate is separated from fluorescence components emitted from positions before and after the optical spot inside the sample and is received by a PMT (Photo Multiplier Tube).

The PMT photoelectrically converts the fluorescence into an electric signal corresponding to the light intensity thereof and outputs it. The electric signal output from the PMT is stored as image data in a memory in an image reading apparatus in synchronization with a scanning signal of the X-Y scanner. A three-dimensional microscopic image of the sample is obtained by processing the image data in correspondence with the scanning signal by ordinary procedure.

The conventional confocal laser scanning fluorescence microscope as described above employs such an arrangement that ideally a point light source and a point photodetector are located at positions conjugate with a point inside the sample whereby the laser beam forms an optical spot having a reduced focal depth. Also, the pinhole is located on the photodetector side so as to remove the fluorescence components emitted from positions before and after the optical spot inside the sample. This can eliminate almost all defocused images except for an image on the focal plane. Accordingly, only the image near the focal plane inside the sample is obtained as a microscopic image.

The prior art on such a confocal laser scanning fluorescence microscope is described in detail, for example, in "Japanese Laid-open Patent Application No. 2-247605".

Also, a conventional two-photon absorption excitation type laser scanning fluorescence microscope employs a laser oscillating a laser beam as a pulse having a very short time duration, in which the laser beam forms an optical spot having a high energy density and the optical spot three-dimensionally scans the inside of a sample in the same manner as in the confocal laser scanning fluorescence microscope as described previously. Because of the arrangement, a fluorescence due to excitation based on two-photon absorption appears only from a point where the optical spot is located inside the sample but no fluorescence due to excitation based on two-photon absorption appears from other portions. Therefore, there appears no defocused image other than one on the focal plane, which improves the contrast of the microscopic image.

The prior art on such a two-photon absorption excitation type laser scanning fluorescence microscope is described in detail for example in references "Science, vol. 248, pp. 73–76, 6 Apr. 1990" and "U.S. Pat. No. 5,034,613, 1991".

Further, conventional general laser scanning fluorescence microscopes employ an axicon prism replacing the objective lens, by which laser beams interfere with each other on the optical axis to be converted into a bundle of rays having a focal depth as long as the thickness of sample, i.e., into a so-called Bessel beam and through which the Bessel beam three-dimensionally scans the inside of sample in the same manner as in the confocal laser scanning fluorescence microscope as described previously. Therefore, an image within the focal depth will never be unfocused, thus obtaining a microscopic image as a two-dimensional projection of a three-dimensional image. In another arrangement a laser beam is guided through an aperture having an annular opening to be shaped in a cylindrical bundle of rays to enter an objective lens, the laser beam forms a Bessel beam having a depth of focus as long as the thickness of the sample, and then the Bessel beam three-dimensionally scans the inside of sample in the same manner as in the confocal laser scanning fluorescence microscope as described previously. Thus, an image within the focal depth will never be unfocused, obtaining a microscopic image as two-dimensional projection of a three-dimensional image.

A conventional optical converting unit for producing a Bessel beam is so arranged that an aperture having an annular opening portion is set on the front focal plane of a convex lens. If a laser beam passes as a beam of parallel rays through the opening portion in the aperture, a diffracted light is produced as a bundle of rays having an annular cross-sectional intensity distribution perpendicular to the optical axis. The diffraction light having passed through the convex lens advances as a plane wave refracted at a constant angle relative to the optical axis and thereafter forms a conical wavefront in axial symmetry with respect to the optical axis at the rear focus of the convex lens. Thus, beams of the diffracted light mutually interfere in the entire region where the wavefront exists near the optical axis, so that a Bessel beam is produced with an intensity enhanced by constructive interference.

In an intensity distribution of the Bessel beam in a cross section perpendicular to the optical axis, a thin linear center beam with strong intensity with the interference region near the optical axis exists almost constantly. On the other hand, concentric cylindrical higher-order diffraction beams with small intensity are present at positions away from the optical axis. It is thus understood that the Bessel beam has a high resolution and a long focal depth.

The prior art on such an annular illumination optical system using the aperture in the laser scanning fluorescence microscope is described in detail, for example, in "Optics, vol. 21, no. 7, pp. 489–497, July 1992". Also, the prior art on production of the Bessel beam by the axicon prism is described in detail, for example, in "Laser Microscope Research Group, the tenth lecture papers, pp. 22–29, November 1992". Further, the prior art on the annular illumination optical system using the axicon prism is described in detail for example in "U.S. Pat. No. 4,887,592, 1989".

However, the conventional confocal laser scanning fluorescence microscope as described above shields the fluorescence components emitted from positions before and after the optical spot inside the sample by locating a pinhole on the photodetector side. This extremely lowers the reception efficiency of fluorescence in the photodetector, which results in a problem of further reducing the intensity of originally weak fluorescence.

Also, in case of the two-photon absorption excitation type laser scanning fluorescence microscope as described above, the fluorescence appears only from an optical spot inside the sample and therefore in order to obtain a three-dimensional microscopic image, the optical spot is scanned in parallel with the optical axis inside the sample in addition to the two-dimensional scanning perpendicular to the optical axis. This requires a long time as the scanning time of the optical spot. In this time a sample of an organism having activity could move, resulting in failing to obtain a correct three-dimensional microscopic image. In addition, there is a problem that a discoloration state or an exhaustion state of fluorescent dye becomes locally different.

Further, the conventional general laser scanning fluorescence microscopes as described above employ the axicon prism replacing the objective lens whereby the laser beam forms a Bessel beam having a focal depth as long as the thickness of sample. Thus, the axicon prism has no imaging function and a state of convergence is not good for the bundle of rays irradiated onto the sample, which results in a problem that the resolution is low in the plane perpendicular to the optical axis of axicon prism. In another case, a laser beam is guided through an aperture having an annular opening to form a bundle of rays having an annular cross section intensity perpendicular to the optical axis and the bundle is made incident into the objective lens, whereby the laser beam forms a Bessel beam having a focal depth as long as the thickness of the sample. Even if the laser beam has a cross-sectional intensity distribution based on an approximately Gaussian distribution, a bundle of rays with peak intensity is shielded by the disc shielding portion in the aperture, which causes a problem that the utilization factor of the laser beam irradiated onto the sample is extremely lowered. Also, the bundle of rays or the optical spot of the laser beam having a large focal depth as described above forms annular beams of the higher-order diffraction beams around a linear beam. This causes a problem that when such a bundle of rays or the optical spot scans the inside of sample, a lot of false signals are generated.

Therefore, the present invention has been accomplished in view of the above problems and an object of the present invention is to provide a laser scanning optical system and a laser scanning optical apparatus which can perform scanning of laser beam with a higher energy utilization factor, a higher resolution and a longer focal depth within a shorter time than the prior art apparatus did.

SUMMARY OF THE INVENTION

A laser scanning optical system of the present invention, for achieving the above object, comprises an optical converting unit for shaping a laser beam incident thereinto as a beam of parallel rays into a cylindrical ray bundle, an optical scanning unit for changing a traveling direction of the laser beam incident from the optical converting unit thereinto to scan, and an optical converging unit for converging the laser beam incident from the optical scanning unit thereinto to produce a Bessel beam, wherein the optical converting unit is composed of two axicon prisms which are arranged such that apexes thereof are opposed forward or backward to each other at a predetermined distance and optical axes thereof are coincident with each other and which are made of respective materials having a same refractive index and shaped with the same apical angle.

Here, the laser scanning optical system may have such a feature that the optical converting unit further has moving means for variably setting a distance between the two axicon prisms.

Also, the laser scanning optical system may have such a feature that it further comprises a beam expander disposed either on the entrance side or on the exit side of the optical converting unit, for expanding a diameter of the ray bundle of laser beam.

Further, the laser scanning optical system may have such a feature that it also comprises a beam reducer disposed either on the entrance side or on the exit side of the optical converting unit, for reducing a diameter of the ray bundle of the laser beam.

Furthermore, a laser scanning optical apparatus of the present invention, for achieving the above object, comprises a light source for emitting a laser beam, an optical converting unit for shaping the laser beam incident from the light source thereinto as a beam of parallel rays into a cylindrical ray bundle thereof, an optical scanning unit for changing a traveling direction of the laser beam incident from the optical converting unit thereinto to scan, and an optical converging unit for converging the laser beam incident from the optical scanning unit thereinto to irradiate a Bessel beam onto a predetermined sample, wherein the optical converting unit is composed of two axicon prisms which are arranged such that apexes thereof are opposed forward or backward to each other at a predetermined distance and optical axes thereof are coincident with each other and which are made of respective materials having a same refractive index and shaped with a same apical angle.

Here, the laser scanning optical apparatus may have such a feature that the light source oscillates the laser beam as a pulse having a very short time duration, the sample is labeled with a predetermined fluorescent dye, the apparatus further comprises an optical detecting unit for detecting fluorescence emitted from the sample based on multiphoton absorption with irradiation of the Bessel beam, and output signals from the optical detecting unit are stored as pixel data in synchronization with scanning of the laser beam to obtain a microscopic image of the sample.

In this case, it is preferred that the optical detecting unit comprises a first photoelectric detector for detecting the fluorescence emitted from a surface side of the sample and a second photoelectric detector for detecting the fluorescence emitted from a back side of the sample and that the microscopic image is produced based on addition of output signals from the first and second photoelectric detectors.

Also, the laser scanning optical apparatus may have such a feature that a surface of the sample is coated with a predetermined photosensitive agent and a predetermined pattern is formed on the photosensitive agent, based on exposure with irradiation of the Bessel beam.

Further, the laser scanning optical apparatus may have such a feature that a surface of the sample is exposed to the outside and a surface region of the sample is shaped into a predetermined shape, based on excitation with irradiation of the Bessel beam.

In the laser scanning optical system of the present invention, the optical converting unit is composed of two axicon prisms. These axicon prisms are so arranged that their apexes are opposed forward or backward to each other at a predetermined distance and their optical axes are coincident with each other, and are made of respective materials having the same index of refraction and shaped with the same apical angle.

By this arrangement, the laser beam incident as a beam of parallel rays into the optical converting unit is refracted at an equal angle relative to the optical axis by one axicon prism to form a conical wavefront and thereafter becomes a divergent bundle of rays having an annular cross-sectional intensity perpendicular to the optical axis. A laser beam emergent from this axicon prism is refracted at an equal angle relative to the optical axis by the other axicon prism to become a cylindrical bundle of rays as parallel beams with the traveling direction being parallel to the optical axis.

The laser beam thus emerging from the optical converting unit is changed in the traveling direction by the optical scanning unit to scan and is converged by the optical converging unit to become a Bessel beam. A diffraction beam intensity distribution of the Bessel beam includes a very thin linear center beam having a strong intensity in the axial direction and numerous concentric cylindrical higher-order diffraction beams present around the center beam. Since the center beam has an extremely strong intensity as compared with those of the higher-order diffraction beams, the Bessel beam has a high resolution and a long focal depth.

Accordingly, the laser scanning optical system of the present invention can form the cylindrical bundle of rays without losing the intensity of the laser beam, so that the scanning of Bessel beam can be carried out with a high energy utilization factor.

For example, in case the optical converting unit further has the moving means for variably setting the distance between the two axicon prisms, the outer diameter of the cylindrical ray bundle outgoing from the optical converting unit can be determined based on the distance between the two axicon prisms. Since the annular zone width, which is a difference between the outer diameter and the inner diameter of the cylindrical ray bundle, is constant based on the diameter of ray bundle of the laser beam incident into the entrance-side axicon prism, a ratio of the inner diameter to the outer diameter of the cylindrical ray bundle continuously changes according to the distance between the two axicon prisms. This changes the diameter and the intensity of the center beam relative to the higher-order diffraction beams in the Bessel beam, which makes adjustment of resolution and focal depth possible.

If there is a beam expander or a beam reducer further provided on the entrance side of the optical converting unit, the diameter of the ray bundle of the laser beam incident on the optical converting unit can be adjustable. Then the annular zone width, which is a difference between the outer diameter and the inner diameter of the cylindrical ray bundle outgoing from the optical converting unit, is determined based on the diameter of ray bundle of the laser beam incident into the entrance-side axicon prism. Since the outer diameter of the cylindrical ray bundle is constant based on the distance between the two axicon prisms, the ratio of the inner diameter to the outer diameter of the cylindrical ray bundle continuously changes in correspondence with the beam expander or beam reducer. Then the diameter and the intensity of the center beam changes with respect to the higher-order diffraction beams in the Bessel beam, which makes adjustment of resolution and focal depth possible.

Also, if there is a beam expander or a beam reducer further provided on the exit side of the optical converging unit, the outer diameter of a cylindrical ray bundle outgoing from the optical converting unit is so adjusted as to coincide with the aperture diameter of the optical converging unit. This causes little eclipse of the laser beam. That is, the energy utilization factor of laser beam is increased, so that a Bessel beam with high energy density can be produced.

In the laser scanning optical apparatus of the present invention a laser beam emitted from a light source is irradiated onto a predetermined sample through the laser scanning optical system of the present invention. By this arrangement, the sample is subjected to scanning with a Bessel beam having a high energy density, a high resolution and a long focal depth.

For example, in case that the light source oscillates a laser beam of very-short-time-duration pulse, that the sample is labeled with a predetermined fluorescent dye, and that the apparatus further comprises an optical detecting unit for detecting fluorescence emitted from the sample based on multiphoton absorption with irradiation of the Bessel beam, the optical detecting unit receives fluorescence from the fluorescent dye as excited at a wavelength corresponding to a fraction of the oscillating wavelength of the laser beam. The multiphoton absorption occurs only in portions where the energy level of laser beam exceeds a predetermined value. Then, if the output of the laser beam is adjusted such that the multiphoton absorption is not caused by the higher-order diffraction beams accompanying the center beam in the Bessel beam, fluorescence will appear only from a position irradiated by the center beam in the Bessel beam within the sample. This can prevent false signals from being produced by the accompanying higher-order diffraction beams in the Bessel beam, which can enhance the resolution of a microscopic image of the sample as obtained by storing as pixel data output signals from the optical detecting unit in synchronization with the scanning with the laser beam.

Two-dimensional scanning is carried out inside the sample with the Bessel beam having the linearly formed center beam, so that a microscopic image is obtained as two-dimensional projection of a three-dimensional image of the sample in the form of integral values in the thickness direction. This can obviate three-dimensional scanning inside the sample, which can greatly reduce the scanning time of optical spot.

Further, if the optical detecting unit is composed of a first photoelectric detector for detecting fluorescence emitted from the surface side of the sample and a second photoelectric detector for detecting fluorescence emitted from the back side of the sample, the fluorescence emitted from the sample can reach the respective photoelectric detectors without any loss. This can improve the contrast in the microscopic image as produced based on addition of output signals from the photoelectric detectors. Therefore, a low-power laser can be used as the light source for emitting the laser beam, which can reduce damage to an organism sample or other type of sample.

In case the surface of sample is coated with a predetermined photosensitive agent and a selected pattern is formed on the photosensitive agent, based on exposure with irradiation of the Bessel beam, exposure can be well done for the photosensitive agent on the substrate irrespective of unevenness of the surface of substrate. This can obviate precise alignment of the position of optical spot of the laser beam with respect to the photosensitive agent, improving the efficiency of operation. Since the Bessel beam has a high resolution, it can be applied to exposure of an integrated circuit pattern on a photosensitive agent on a substrate, whereby the degree of integration can be increased for integrated circuits formed based on this pattern.

Further, in case the surface of sample is exposed to the outside and a surface region of sample is shaped in a predetermined shape based on excitation with irradiation of the Bessel beam, the surface region of the substrate can be etched without being affected by unevenness of itself, because the Bessel beam has a long focal depth. This can obviate precise alignment of the position of optical spot of laser beam with respect to the substrate, which improves the efficiency of operation. Since the Bessel beam has a high resolution and if the sample is an IC chip having integrated circuits on its surface region, a structurally fine defect occurring in the integrated circuits can be repaired.

DESCRIPTION OF THE PREFERRED EMBODIMENTS

Figure 1:
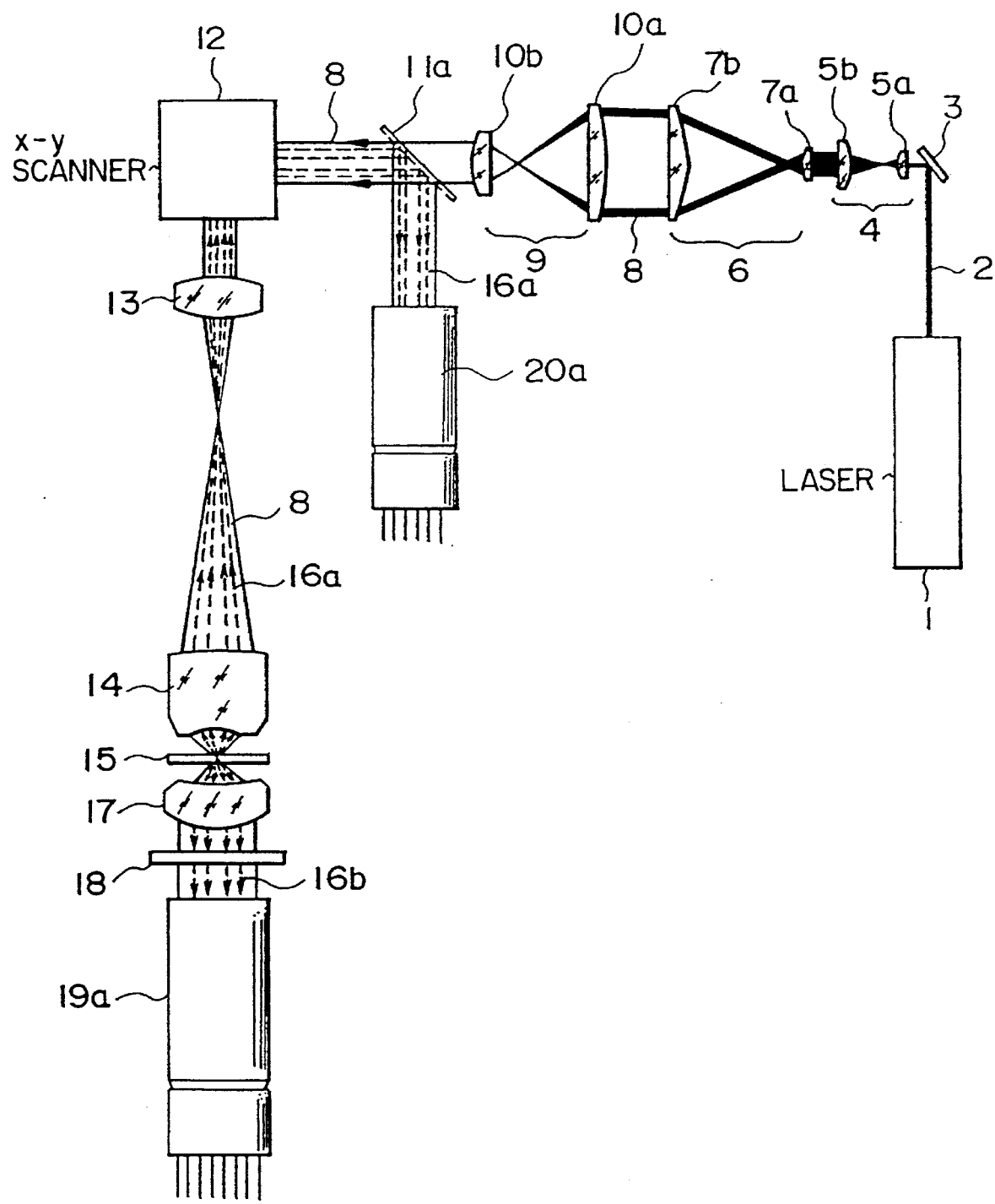
FIG. 1 is a structural drawing to show a first embodiment associated with a fluorescence microscope using a laser scanning optical system of the present invention.

The structure and operation of embodiments according to the present invention will be described with reference from FIG. 1 to FIG. 12. In the description of the drawings, the same elements will be denoted by same reference numerals and redundant description will be omitted. In should be also noted that the dimensions of the drawings do not always coincide with those in the description.

FIG. 1 is a structural drawing showing a first embodiment associated with a fluorescence microscope using the laser scanning optical system of the present invention. In the fluorescence microscope, a plane mirror 3 is disposed along a traveling direction of a laser beam 2 emitted from a laser (light source) 1. Along the traveling direction of laser beam 2 reflected by the plane mirror 3 in the direction perpendicular to the optical axis, there is a beam expander 4, an axicon pair (optical converting unit) 6, a beam reducer 9, a dichroic mirror 11a and an X-Y scanner (optical scanning unit) 12 arranged approximately on a line. Along the traveling direction of the laser beam 2 outgoing from the X-Y scanner 12 in the direction perpendicular to the optical axis, there is an imaging lens 13, an objective lens 14 (optical converging unit) and a sample 15 arranged approximately on a line. Along the traveling direction of fluorescence 16b emitted from the front side of the sample 15, there is a condenser lens 17, a barrier filter 18 and a PMT 19a arranged approximately on a line. On the other hand, there is a PMT 20a arranged along the traveling direction of fluorescence 16a emitted from the back side of the sample 15 and then passing through the objective lens 14, the imaging lens 13 and the X-Y scanner 12 to be further reflected by the dichroic mirror 11a in the direction perpendicular to the optical axis.

The laser 1 is a light source for oscillating the laser beam 2 in a pulse having a very short time duration. The laser beam 2 is a beam of parallel rays having an optical pulse duration of several ten to several hundred fs, a repetitive frequency of several ten to several hundred MHz and a wavelength two or three times longer than the peak wavelength in an absorption spectrum of a fluorescent dye for labeling the sample 15. The plane mirror 3 has a mirror surface inclined approximately at 45 degrees relative to the traveling direction of laser beam 2 emitted from the laser 1 and the mirror surface reflects the laser beam 2 incident thereinto from the laser 1.

The beam expander 4 is composed of two convex lenses 5a, 5b, which enlarges the ray bundle of the laser beam 2 incident thereon from the plane mirror 3 into a bundle having a predetermined diameter. These convex lenses 5a, 5b are so arranged at a predetermined distance that the optical axes thereof are coincident with each other.

Figure 13A:
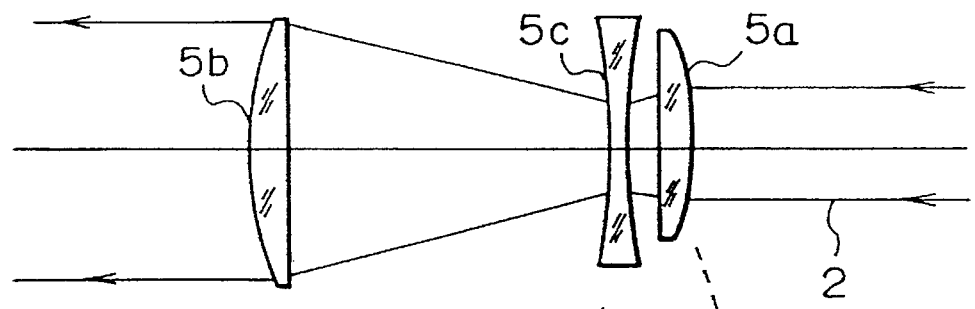
FIGS. 13(a)–13(c) are structural drawings to show a beam expander or a beam reducer in the fluorescence microscope of FIG. 1 in more detail.
Figure 13B:
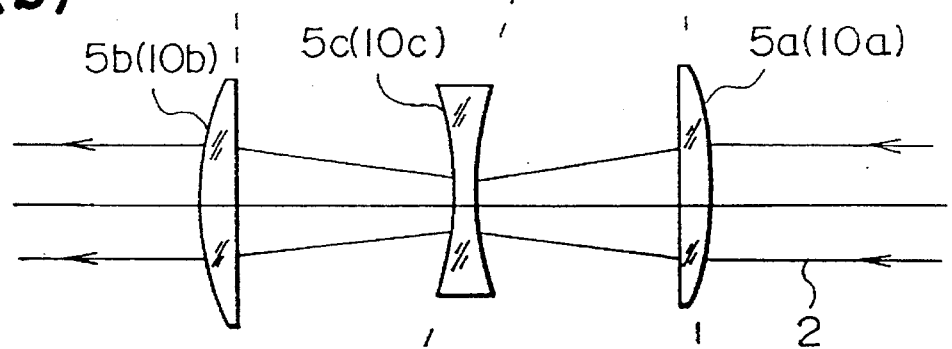

It is also preferred that the beam expander 4 is further composed a concave lens 5c arranged between two convex lenses 5a, 5b as shown in FIG. 13(a) to variably set the distance between the convex lens 5a and the concave lens 5c by unrepresented moving means of the concave lens 5c. In this arrangement, the convex lenses 5a, 5b and the concave lens 5c respectively function as a focus-lag-correction lens group, a fixed lens group and a zoom lens group. Therefore a magnification ratio for the diameter of the ray bundle of laser beam 2 is continuously changeable or zoomed when the position of the concave lens 5c is changed from a region as shown in FIG. 13(b) to the region shown FIG. 13(a).

Figure 2:
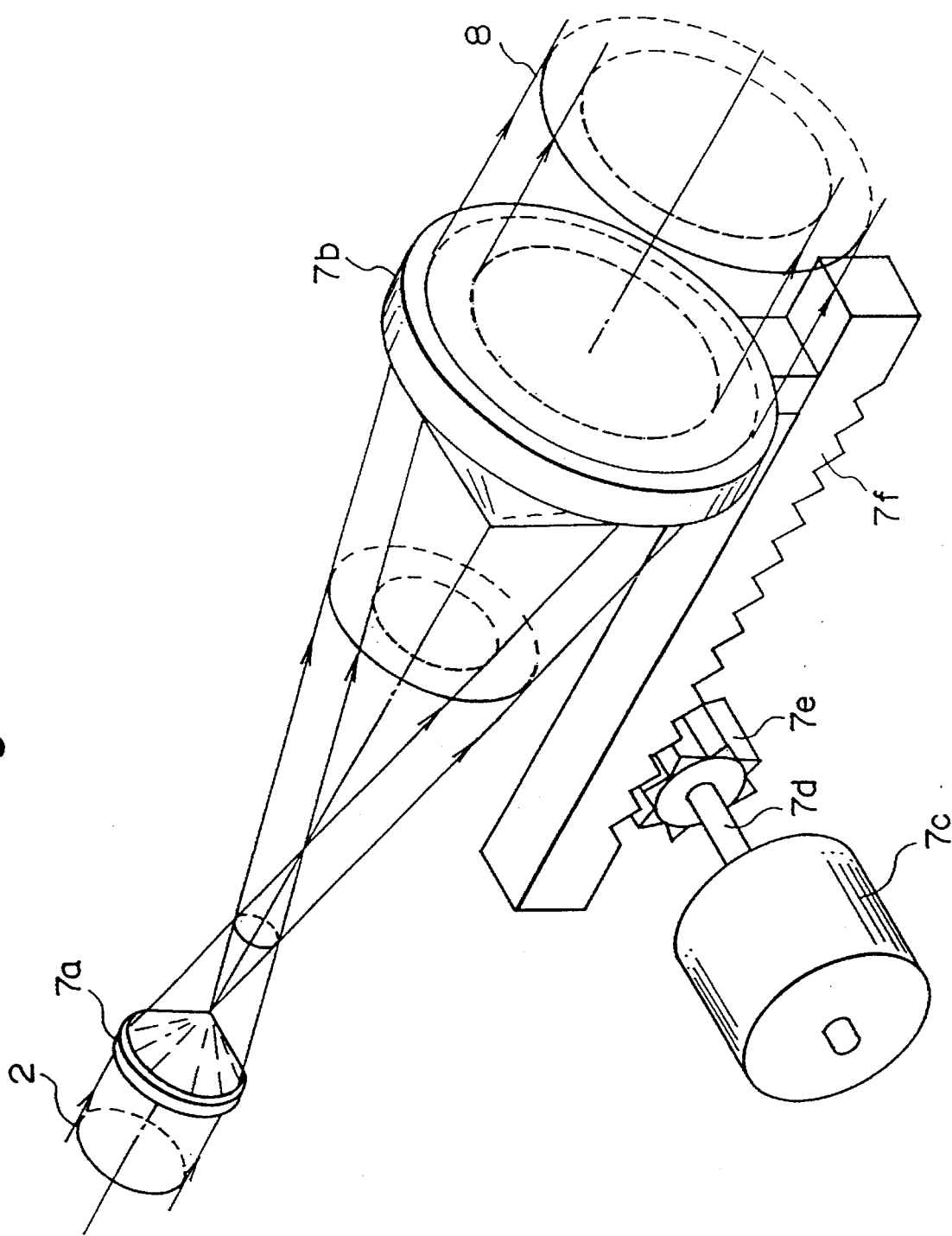
FIG. 2 is a structural drawing to show an axicon pair in the fluorescence microscope of FIG. 1 in more detail.
Figure 3:
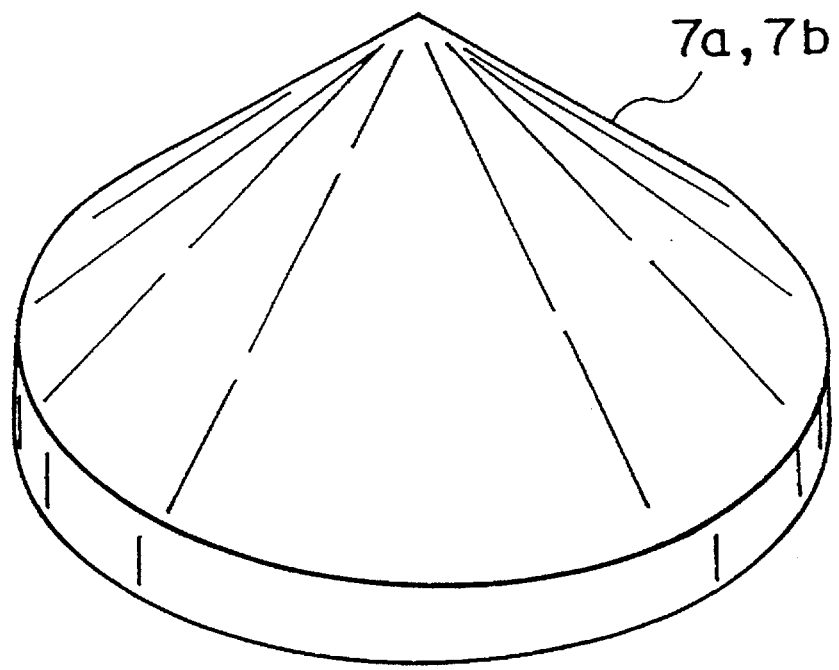
FIG. 3 is a perspective view to show the structure of axicon prisms in the axicon pair of FIG. 2.

FIG. 2 is a structural drawing to show the axicon pair 6 in more detail. FIG. 3 is a perspective view to show the configuration of an axicon prism in the axicon pair 6. The axicon pair 6 is composed of two axicon prisms 7a, 7b, a motor 7c, a rotation axis 7d, a pinion gear 7e and a rack gear 7f. These axicon prisms 7a, 7b are made of respective materials having the same index of refraction in the shape of a circular cone. Also, the axicon prisms 7a, 7b are so arranged that the apical angles thereof having the same angle are opposed forward or backward to each other at a predetermined distance and the optical axes thereof are coincident with each other.

A distance between such axicon prisms 7a, 7b is variably set by unrepresented moving means. For example, in such a moving means the pinion gear 7c is set at the distal portion of the rotation axis 7d which transmits the drive of the motor 7c, and the rack gear 7e is set at the distal portion of the axicon prism 7b. The gear teeth of the pinion gear 7e and the rack gear 7f are so combined that the rotation direction of the pinion gear 7e and the moving direction of the rack gear 7f are arranged along a direction parallel to the optical axis. In this arrangement, when the motor 7c rotates in a predetermined direction, the axicon prism 7b moves in the direction corresponding to the rotation direction of the motor 7c along the optical axis. Therefore the distance between the axicon prisms 7a, 7b changes relatively. Here, it is also preferred that the structure of such a rack and pinion is respectively set at both of the axicon prism 7a, 7b and is set at least at one or the other.

Figure 4:
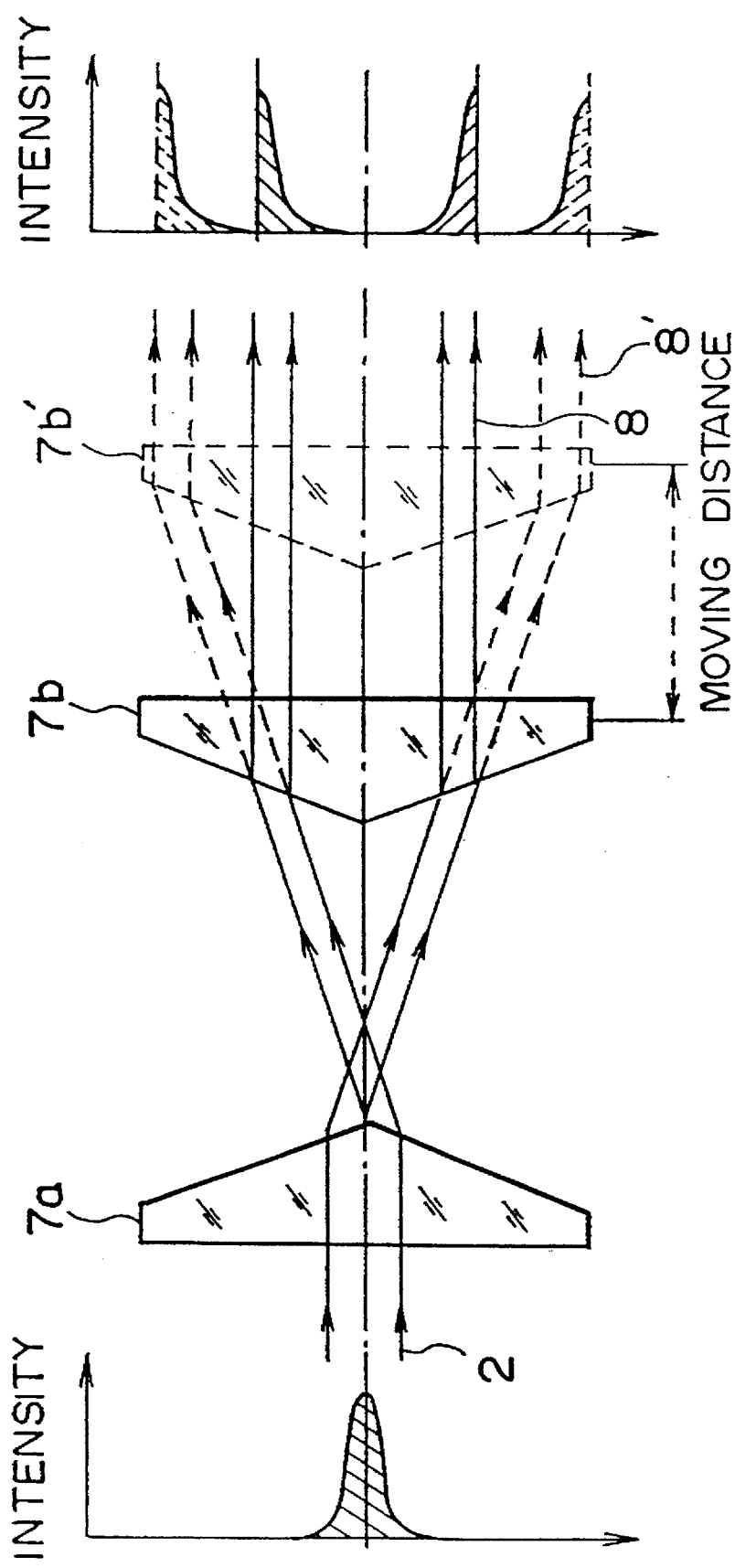
FIG. 4 is composed of a graph to show an intensity distribution in a plane perpendicular to the direction of the optical axis as to a laser beam incident into the axicon pair of FIG. 2, a structural drawing to show a case in which a distance between the two axicon prisms in the axicon pair of FIG. 2 is variably set, and a graph to show an intensity distribution in a plane perpendicular to the direction of the optical axis as to a laser beam outgoing from the axicon pair of FIG. 2.

FIG. 4 is a graph showing an intensity distribution in a plane perpendicular to the optical axis as to the laser beam 2 incident into the axicon pair 6, a structural drawing showing a case in which the distance between the two axicon prisms 7a, 7b is variably set, and a graph to show an intensity distribution in a plane perpendicular to the optical axis as to the laser beam 2 outgoing from the axicon pair 6.

The axicon pair 6 is so arranged that the laser beam 2 is incident as a beam of parallel rays having cross-sectional intensities based on a substantial Gaussian distribution perpendicular to the optical axis, from the beam expander 4 into the axicon prism 7a, and that the axicon prism 7a refracts the laser beam 2 at a constant angle relative to the optical axis to emit a conical ray bundle having an annular cross-sectional intensity perpendicular to the optical axis. On the other hand, the axicon prism 7b refracts the laser beam 2 incident thereon from the axicon prism 7a at a constant angle relative to the optical axis, to emit a cylindrical ray bundle 8 traveling in the direction parallel to the optical axis. The outer diameter $\alpha$ of the cylindrical ray bundle 8 is determined by the distance between the axicon prisms 7a, 7b, and the annular zone width, which is a difference between the outer diameter $\alpha$ and the inner diameter $\alpha'$, is determined based on the diameter of the ray bundle of the laser beam 2 incident on the axicon prism 7a. Therefore, a ratio $\beta(=\alpha'/\alpha)$ of the inner diameter $\alpha'$ to the outer diameter $\alpha$ can be set while continuously changed or zoomed in correspondence with the distance between the axicon prisms 7a, 7b.

The beam reducer 9 is composed of two convex lenses 10a, 10b, which reduces the outer diameter of the laser beam 2 incident as the cylindrical ray bundle 8 thereon from the axicon pair 6 so as to match with the aperture diameter of the objective lens 14. These convex lenses 10a, 10b are so arranged at a predetermined distance that the optical axes thereof are coincident with each other.

Figure 13C:
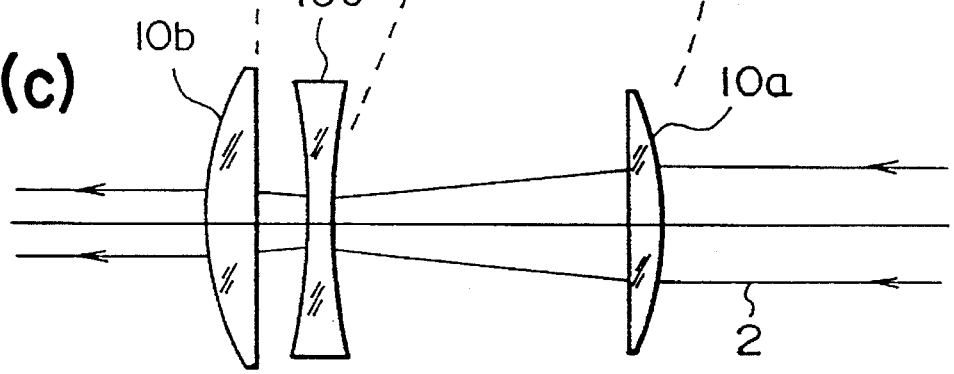

It is also preferred that the beam reducer 9 is further composed of a concave lens 10c arranged between two convex lenses 10a, 10b as shown in a FIG. 13(c) to variably set the distance between the convex lens 10a and the concave lens 10c by unrepresented moving means of the concave lens 10c. In this arrangement, the convex lenses 10a, 10b and the concave lens 10c respectively function as a focus-lag-correction lens group, a fixed lens group and a zoom lens group. Therefore a magnification ratio for the diameter of ray bundle of laser beam 2 is continuously changeable or zoomed when the position of the concave lens 10c is changed from FIG. 13(b) to FIG. 13(c).

The dichroic mirror 11a is so formed as to have a large transmittance for the oscillation wavelength of the laser beam 2 incident from the beam reducer 9 and a large reflectivity for light components in a predetermined wavelength range including the fluorescence 16a incident from the X-Y scanner 12. The X-Y scanner 12 is for example a galvanometer scanner, a resonant scanner, a piezo oscillation scanner, a rotary polygon scanner, an ultrasonic vibrator deflector (Acousto-Optic Deflector), etc. The X-Y scanner 12 changes the traveling direction of the laser beam 2 incident thereon from the dichroic mirror 11a within a predetermined angular range to scan the beam in two orthogonal directions in a plane and similarly changes the traveling direction of fluorescence 16a incident thereon from the imaging lens 13 to deflect it toward the dichroic mirror 11a.

The imaging lens 13 focuses the laser beam 2 incident thereon from the X-Y scanner 12 to form a beam spot on the front image plane of the objective lens 14. The fluorescence 16a is focused as a beam spot on the rear image plane of the imaging lens 13 and the fluorescence 16a incident from the beam spot as a virtual light source into the imaging lens 13 is emergent as a beam of parallel rays therefrom. The objective lens 14 converges the laser beam 2 incident as a virtual light source of a beam spot formed on the front image plane thereof to produce a Bessel beam as a beam spot converged up to the diffraction limit and to let the Bessel beam pass through the inside of sample. The objective lens 14 collects the fluorescence 16a emitted from the surface side of sample 15 to form a beam spot on the rear image plane of imaging lens 13.

Here, near the rear focus of objective lens 14 the shape of three-dimensional intensity distribution of the Bessel beam changes depending upon the annular zone width of the cylindrical ray bundle 8. That is, the Bessel beam changes the intensity distribution of the center beam and higher-order diffraction beams in accordance with a change of ratio $\beta$ ($=\alpha'/\alpha$) of the inner diameter $\alpha'$ to the outer diameter $\alpha$ of the cylindrical ray bundle 8.

Figure 5:
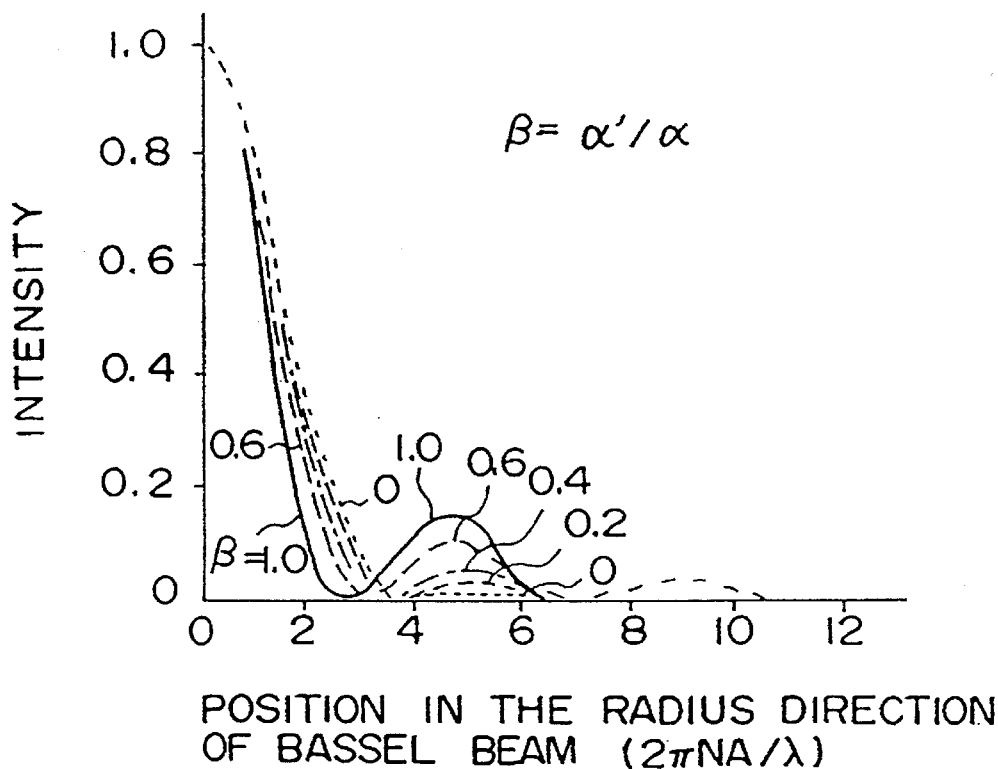
FIG. 5 is a graph to show a change of intensity distribution of Bessel beam in a plane perpendicular to the optical axis with a change of the ratio of the inner diameter to the outer diameter of the cylindrical ray bundle.
Figure 6:
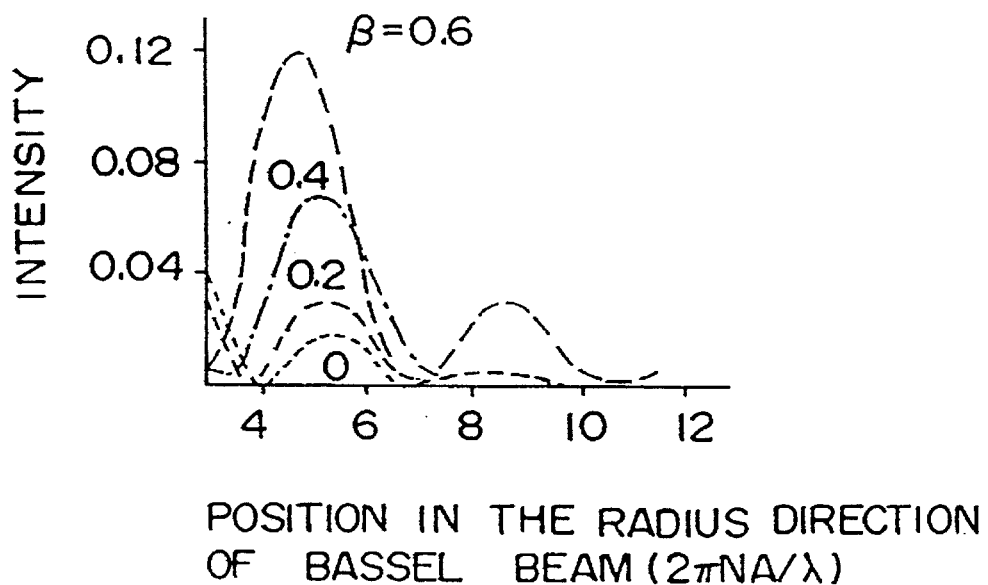
FIG. 6 is a graph to show an enlarged main portion in the intensity distribution of FIG. 5.

FIG. 5 is a graph showing a change of intensity distribution of Bessel beam in a plane perpendicular to the optical axis with a change of the ratio of the inner diameter to the outer diameter of the cylindrical ray bundle 8. FIG. 6 is a graph showing an enlarged main portion in the intensity distribution of FIG. 5. Here, the scale unit on the horizontal axis is shown as $2\pi NA/\lambda$ (NA: the numerical aperture of the objective lens, k: the wavelengnh of the laser beam ). The scale on the vertical axis is shown as normalized based on the intensity in correspondence with the peak wavelength of the laser beam.

As the ratio $\beta$ of the inner diameter to the outer diameter of the cylindrical ray bundle 8 approaches 1, the spot diameter of the center beam decreases while the intensity of higher-order diffraction beams increases relative to the center beam. Also, the shape of the center beam and higher-order diffraction beams becomes longer in the direction of the optical axis. Consequently, it is seen that if the shape of the cylindrical ray bundle 8 is annular with a narrower width, the Bessel beam increases the focal depth and the resolution.

The sample 15 is for example an organism sample labeled with a predetermined fluorescent dye, which is located nearly at a position which is at the rear image plane of objective lens 14 and the front image plane of condenser lens 17. The sample 15 is excited to emit fluorescence 16a, 16b, based on the multiphoton absorption at the position irradiated by the laser beam 2 incident as the Bessel beam from the objective lens 14. Also, the sample 15 is set on an unrepresented stage and is moved along the optical axis together with the stage.

The condenser lens 17 collects the laser beam 2 and the fluorescence 16b outgoing from the back side of sample 15 to emit them as parallel rays. The barrier filter 18 has a high transmittance for light components in a predetermined wavelength range including the fluorescence 10b emergent from the sample 15 and a large absorbance for the oscillation wavelength of the laser beam 2 emergent from the sample 15.

The PMTs (Photo-Multiplier Tube) 19a, 20a are photoelectric detectors such as photomultipliers. The PMT 19a receives the fluorescence 16b outgoing from the barrier filter 18 and photoelectrically converts it into an electric signal reflecting the optical intensity thereof to output the electric signal. On the other hand, the PMT 20a receives the fluorescence 16a incident thereon from the dichroic mirror 11a and photoelectrically converts it into an electric signal reflecting the optical intensity thereof to output the electric signal.

Next described is the operation of the above first embodiment associated with the fluorescence microscope.

The laser beam 2 represented by the solid line is emitted from the laser 1 and thereafter is reflected by the plane mirror 3 in the direction perpendicular to the optical axis. The beam expander 4 expands the diameter of ray bundle of laser beam 2 coming from the plane mirror 3 into a predetermined value while keeps-rig the traveling direction thereof aligned with the direction of the optical axis.

In the axicon pair 6, all the laser beam 2 outgoing as collimated plane waves from the beam expander 4 is refracted by the axicon prism 7a at the same angle relative to the optical axis to form a conical wavefront and thereafter to become a diverging bundle of rays having an annular cross-sectional intensity perpendicular to the optical axis. All of laser beam 2 outgoing from the axicon prism 7a is refracted by the axicon prism 7b at the same angle relative to the optical axis to become a cylindrical ray bundle 8 in the form of a beam of parallel rays traveling in the direction parallel to the optical axis. Here, the beam diameter of the cylindrical ray bundle 8 shown by the solid lines is freely and continuously variable according to the distance between the axicon prisms 7a, 7b, and the beam diameter is so set as to coincide with the aperture diameter of the objective lens 14 under the overall magnification including the pupil image magnification of the imaging lens 13 after having passed through the beam reducer 9.

The beam reducer 9 reduces the diameter of the ray bundle of the laser beam 2 outgoing as the cylindrical ray bundle 8 from the axicon pair 6 into a predetermined value while keeping the traveling direction thereof aligned with the direction of the optical axis. On this occasion the annular zone width is simultaneously compressed in the annular cross section perpendicular to the optical axis in the cylindrical ray bundle 8. The laser beam 2 outgoing from the beam reducer 9 passes through the dichroic mirror 11a and then is made outgoing in the direction perpendicular to the optical axis by the X-Y scanner 12. The X-Y scanner 12 changes the traveling direction of the laser beam 2 within a predetermined angular range to deflect it in two orthogonal directions in a plane.

The laser beam 2 outgoing from the X-Y scanner 12 is focused by the imaging lens 13 to form to beam spot on the front image plane of objective lens 14. It can be said that the beam spot is a virtual light source as two-dimensionally deviated by the X-Y scanner 12. The laser beam 2 outgoing as the conical ray bundle from the beam spot passes only through the peripheral portion of the objective lens 14 to be output therefrom and is allowed to impinge on the sample 15 as the Bessel beam which is a beam spot converged up to the diffraction limit. The Bessel beam has a diffraction beam intensity distribution composed of a very thin linear center beam having a large intensity in the direction of the optical axis and numerous concentric cylindrical higher-order diffraction beams existing around the center beam. Also, the X-Y scanner 12 makes the Bessel beam effect the two-dimensional scanning, for example the raster scanning, inside the sample 15.

Inside the sample 15 the so-called multiphoton absorption occurs only in a portion irradiated by the Bessel beam having an optical intensity part exceeding a predetermined threshold. By this, the labelling fluorescent dye in the sample 15 emits the fluorescence 16a, 16b represented by the broken lines as a linear, secondary light source proportional to an amount of the fluorescent dye similarly as in case of excitation by a peak wavelength in the absorption spectrum corresponding to a half or one third of the oscillation wavelength of laser beam 2.

The laser beam 2 passing through and outgoing from the sample 15 passes through the condenser lens 17 to become a beam of parallel rays traveling in parallel with the optical axis and thereafter to be absorbed by the barrier filter 18. The fluorescence 16b outgoing from the back side of the sample 15 passes through the condenser lens 17 to become a beam of parallel rays traveling in parallel with the optical axis and thereafter passes through the barrier filter 18 then to be received by the PMT 19a. On the other hand, the fluorescence 16a outgoing from the surface side of sample 15 travels backward in the optical path through which the laser beam 2 has passed while condensed by the objective lens 14. The fluorescence 16a outgoing from the X-Y scanner 12 is reflected by the dichroic mirror 11a in the direction perpendicular to the optical axis and thereafter is received by the PMT 20a.

The PMTs 19a, 20a output electric signals corresponding to the optical intensities of fluorescence 16a and fluorescence 16b, respectively, after photoelectric conversion, and the electric signals are added to each other. The signal thus added is stored as pixel data in a memory in an unrepresented image reading apparatus in synchronization with a scanning signal of the X-Y scanner 12. Processing this pixel data in correspondence with the scanning signal by ordinary procedure, a microscopic image is obtained as two-dimensional projection of a three-dimensional image of the sample 15.

With the first embodiment associated with the fluorescence microscope as described above, the laser beam oscillated as a very short time duration pulse is converted using the two axicon prisms into the cylindrical ray bundle having the narrow, annular cross-sectional intensity perpendicular to the optical axis. By this, there is almost no loss in intensity of laser beam caused in producing the cylindrical ray bundle. This can increase the energy utilization factor of laser beam and can maintain high the energy density, which contributes to the multiphoton absorption inside the sample.

Also, the laser beam oscillated as the very short time duration pulse passes only through the peripheral portion of objective lens in the form of the cylindrical ray bundle, whereby the Bessel beam with the thin linear center beam formed with a large intensity in the direction of the optical axis is irradiated into the sample. This excites the sample only at the position irradiated by the Bessel beam by the multiphoton absorption. Then, the fluorescence emitted based on the labeling fluorescent dye in the sample is received with high efficiency by the photoelectric detectors without a need to use a pinhole. Also, the multiphoton absorption in the sample can be made to occur only in a very thin portion further closer to the center region of the Bessel beam by adjusting the energy density of laser beam. Then the fluorescence microscope may have a further higher resolution and a longer focal depth.

In addition, the fluorescence emitted from both the surface and back sides of the sample is received by a plurality of photoelectric detectors and a microscopic image is obtained by adding the output signals from these photoelectric detectors. This permits the fluorescence to reach the photoelectric detectors with almost no loss. Therefore, a low-power laser can be employed, which can reduce damage to an organism used as a sample or another sample.

Further, the Bessel beam has the linearly formed center beam, with which the two-dimensional scanning is performed inside the sample. This provides a microscopic image in which a three-dimensional image of sample is two-dimensionally projected, as integration values in the thickness direction. This can obviate the three-dimensional scanning inside the sample, which greatly decreases the scanning time of optical spot.

Figure 7:
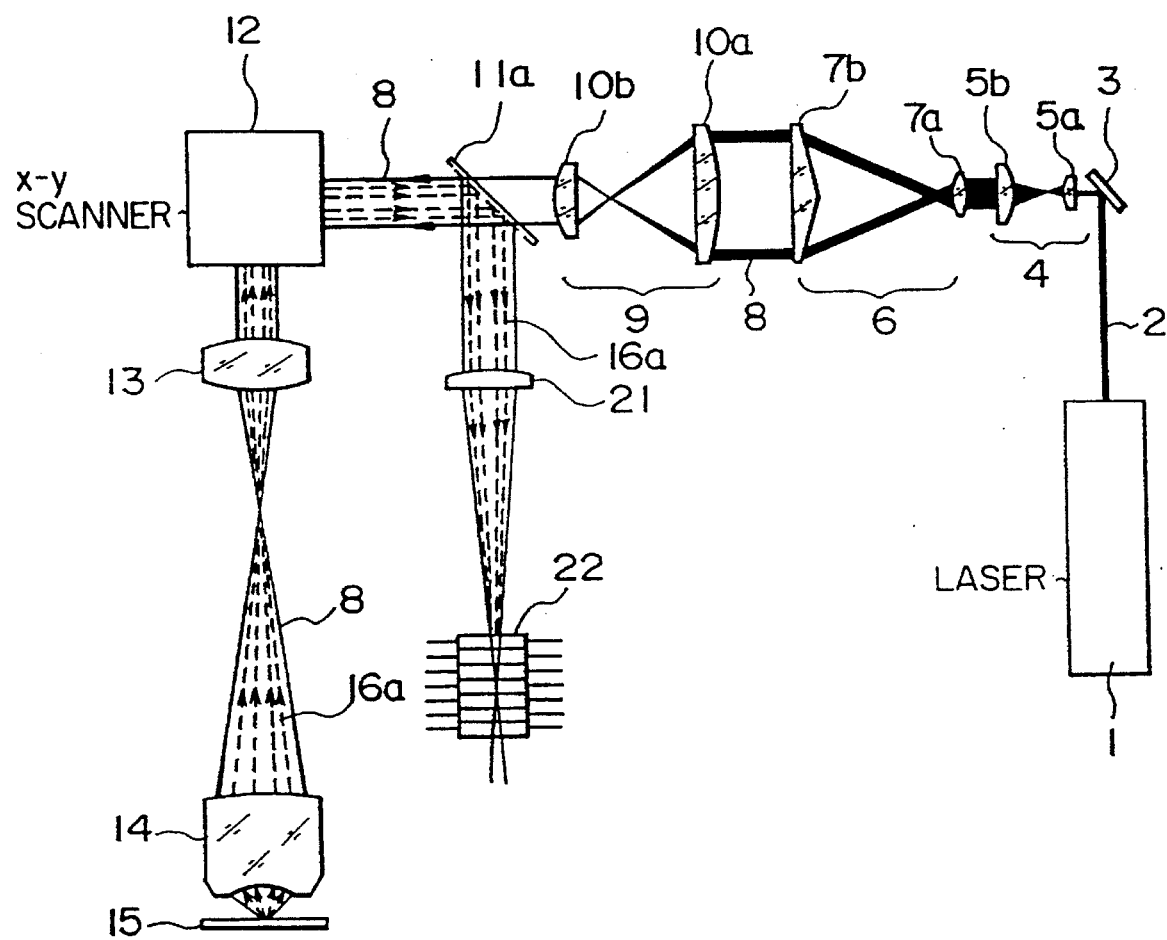
FIG. 7 is a structural drawing to show a second embodiment associated with a fluorescence microscope using a laser scanning optical system of the present invention.

FIG. 7 is a structural drawing to show a second embodiment associated with the fluorescence microscope using the laser scanning optical system of the present invention. The present embodiment is constructed almost in the same manner as the above first embodiment associated with the fluorescence microscope. However, the present embodiment excludes the condenser lens 17, the barrier filter 18 and the PMT 19a for measuring the fluorescence emitted from the back side of sample 15. Also, on the reflection side of the dichroic mirror 11a there are a collimator lens 21 and a laminated sensor array 22 arranged approximately on a line along the traveling direction of fluorescence 16a emitted from the surface side of sample 15. The collimator lens 21 is so arranged that the rear focus thereof is located at the center of the laminated sensor array 22. Also, the laminated sensor array 22 is so arranged that the center axis in the lamination direction thereof is coincident with a linear fluorescent image of fluorescence 16a.

Figure 8:
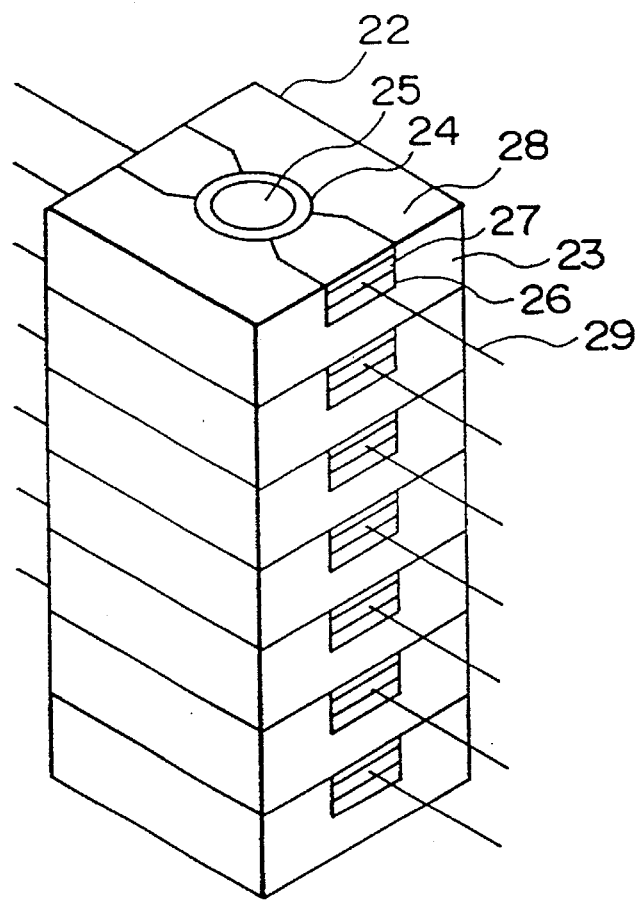
FIG. 8 is a perspective view to show the structure of a laminated sensor array in the fluorescence microscope of FIG. 7.
Figure 9:
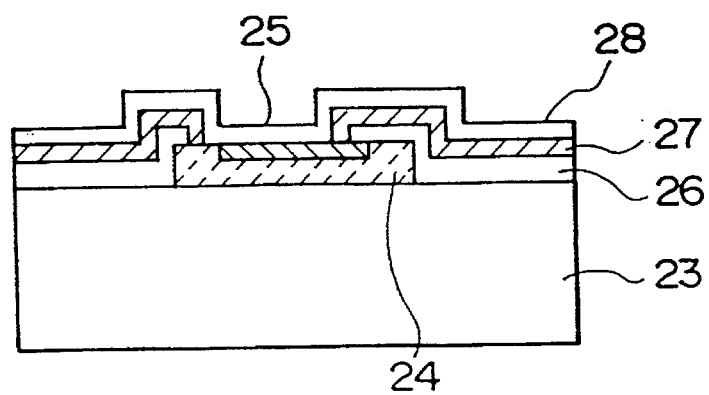
FIG. 9 is a cross sectional view along the lamination thickness direction of a single sensor in the laminated sensor array of FIG. 8.

FIG. 8 is a perspective view to show the structure of the laminated sensor array 22. FIG. 9 is a cross sectional view of a sensor in the laminated sensor array 22 along the lamination thickness direction. The laminated sensor array 22 is composed of numerous photoelectric sensors concentrically laminated. Each photoelectric sensor is so constructed that a photoelectric detecting portion having a p-type Si layer 25 of flat circular cylinder on an n-type Si layer 24 of circular cylinder is formed on a transparent substrate 23. Transparent electrodes 27 for outputting signal charge are provided through insulating layers of $SiO_2$ layers 26, 28 on the transparent substrate 23 including the photoelectric detecting portion. Metal lines 29 are connected to the transparent electrodes 27, and are exposed to the outside.

Next described is the operation of the above second embodiment associated with the fluorescence microscope.

The present embodiment is operated almost in the same manner as the above first embodiment associated with the fluorescence microscope. However, the fluorescence 16a emitted from the surface side of sample 15 is collected by the objective lens 14, travels backward in the optical path where the laser beam 2 has passed, and is reflected by the dichroic mirror 11a in the direction perpendicular to the optical axis. After that, it passes through the collimator lens 21 to form a beam spot at the center of the laminated sensor array 22. The optical spot produces a thin linear fluorescence image near the rear focus of collimator lens 21, which is received by the laminated sensor array 22. The laminated sensor array 22 converts the fluorescence 16a into an electric signal by the laminated photoelectric sensors and outputs the electric signal through the metal lines 29.

Electric signals output from the photoelectric sensors in the sensor array 22 by photoelectric conversion in correspondence with the optical intensity are stored in parallel as pixel data in a memory in an unrepresented image reading apparatus in synchronization with the scanning signal of the X-Y scanner 12. The pixel data is processed in correspondence with the scanning signal by ordinary procedure, so that microscopic images are simultaneously obtained as two-dimensional cross-sectional images obtained by dividing a three-dimensional image of the sample 15 into pieces in the number of photoelectric sensors.

With the above second embodiment associated with the fluorescence microscope, the Bessel beam having the linearly formed center beam is used to perform the two-dimensional scanning inside the sample and the fluorescence diverging from the sample is focused by the collimator lens to form a thin linear optical spot in the laminated sensor array to be received thereby. By this, a three-dimensional image of the sample is obtained as a lot of two-dimensional cross-sectional images divided in the direction of the optical axis. This can obviate necessity of three-dimensional scanning inside the sample, which greatly reduces the scanning time of optical spot.

Figure 10:
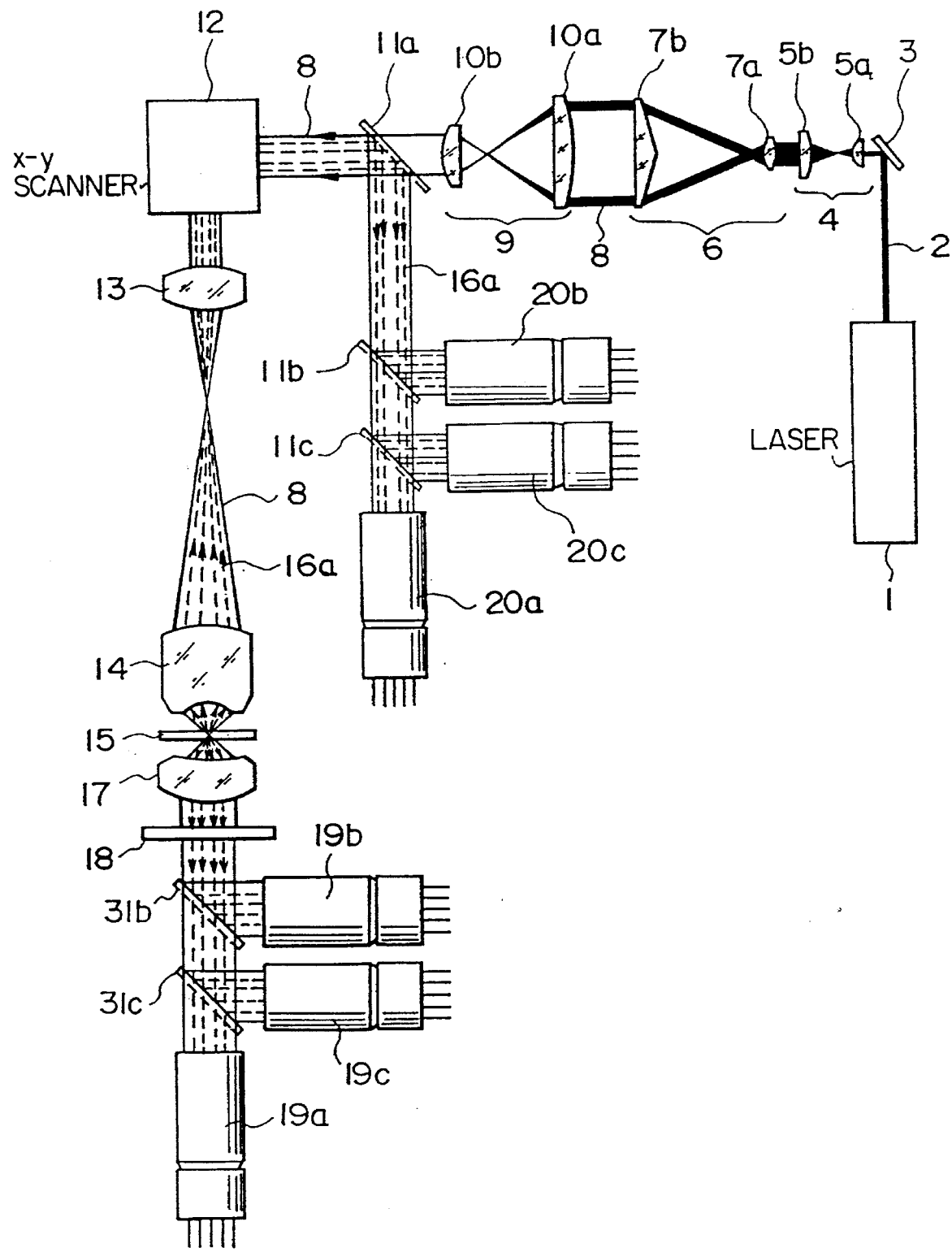
FIG. 10 is a structural drawing to show a third embodiment associated with a fluorescence microscope using a laser scanning optical system of the present invention.

FIG. 10 is a structural drawing to snow a third embodiment associated with the fluorescence microscope using the laser scanning optical system of the present invention. The present embodiment is constructed almost in the same manner as the above first embodiment associated with the fluorescence microscope. However, the sample 15 is labeled with plural types of fluorescent dyes and the fluorescent dyes have mutually different fluorescence emission wavelengths. Also, on the reflection side of a dichroic mirror 11a there are dichroic mirrors 11b, 11c and a PMT 20a arranged approximately on a line along the traveling direction of fluorescence 16a emitted from the surface side of sample 15. PMTs 20b, 20c are disposed on the reflection side of the dichroic mirrors 11b, 11c, respectively. On the other hand, on the exit side of barrier filter 18 there are dichroic mirrors 31b, 31c and a PMT 19a arranged approximately on a line along the traveling direction of fluorescence 16b emitted from the back side of sample 15. PMTs 19b, 19c are disposed on the reflection side of the dichroic mirrors 31b, 31c, respectively.

The dichroic mirror 11a is so formed as to have a large transmittance for the oscillation frequency of laser beam 2 incident thereinto from the beam reducer 9 and a large reflectivity for light components in a predetermined wavelength range including the fluorescence 16a incident thereinto from the X-Y scanner 12. The dichroic mirror 11b, 11c has a large reflectivity for either of mutually different wavelength bands including associated fluorescence components with mutually different emission wavelengths present in the fluorescence 16a emitted from the dichroic mirror 11a. The dichroic mirror 31b, 31c has a large reflectivity for either of mutually different wavelength bands including associated light components with mutually different emission wavelengths present in the fluorescence 16b outgoing from the barrier filter 18.

The PMTs 19a–19c, 20a–20c are photoelectric detectors such as photomultipliers. The PMT 19b receives the fluorescence 16b reflected by the dichroic mirror 31b and photoelectrically converts it into an electric signal corresponding to the optical intensity to output the electric signal. The PMT 19c receives the fluorescence 16b reflected by the dichroic mirror 31c and photoelectrically converts it into an electric signal corresponding to the optical intensity to output the electric signal. The PMT 19a receives the fluorescence 16b passing through the dichroic mirrors 31b, 31c and photoelectrically converts it into an electric signal corresponding to the optical intensity to output the electric signal. The PMT 20b receives the fluorescence 16a reflected by the dichroic mirror 11b and photoelectrically converts it into an electric signal corresponding to the optical intensity to output the electric signal. The PMT 20c receives the fluorescence 16a reflected by the dichroic mirror 11c and photoelectrically converts it into an electric signal corresponding to the optical intensity to output the electric signal. The PMT 20a receives the fluorescence 16a passing through the dichroic mirrors 11b, 11c and photoelectrically converts it into an electric signal corresponding to the optical intensity to output the electric signal.

Next described is the operation of the third embodiment associated with the fluorescence microscope.

The present embodiment is operated almost in the same manner as the above first embodiment associated with the fluorescence microscope. However, the fluorescence 16a emitted from the surface side of sample 15 is collected by the objective lens 14 to travel backward in the optical path through which the laser beam 2 has passed, it is then reflected by the dichroic mirror 11a in the direction perpendicular to the optical axis, some light components are reflected by the dichroic mirrors 11b, 11c to be received by the PMTs 20b, 20c, respectively, and the other light components are received by the PMT 20a.

On the other hand, the fluorescence 16b emitted from the back side of sample 15 is collected by the condenser lens 17 to become a beam of parallel rays traveling in the traveling direction, the beam passes through the barrier filter 18, thereafter some light components are reflected by the dichroic mirrors 31b, 31c to be received by the PMTs 19b, 19c, respectively, and the other light components are received by the PMT 19a.

Added to each other are an electric signal output from each PMT 20a–20c after photoelectric conversion corresponding to the optical intensity of an associated light component in the fluorescence 16a and an electric signal output from corresponding PMT 19a–19c after photoelectric conversion corresponding to the optical intensity of an associated light component in the fluorescence 16b. The electric signals as so added are stored as pixel data in a memory in an unrepresented image reading apparatus in synchronization with scanning signals of the X-Y scanner 12. Processing the pixel data in correspondence with the scanning signals based on ordinary procedure, a microscopic image as two-dimensional projection of a three-dimensional image of sample 15 is obtained for each fluorescence component in the fluorescence 16a, 16b, i.e., for each emission wavelength of labeling fluorescent dye in the sample 15.

In the third embodiment associated with the fluorescence microscope as described above, the sample is labeled with plural types of fluorescent dyes having mutually different emission wavelengths, and light components in the fluorescence diverging from the sample are separated from each other by the dichroic mirrors to be received by the photoelectric detectors. By this arrangement, if the two-dimensional scanning is once executed inside the sample with the Bessel beam having the linearly formed center beam, a three-dimensional image of the sample is formed as a plurality of microscopic images simultaneously obtained as two-dimensional projection based on the emission wavelengths of the fluorescent dyes. This can obviate three-dimensional scanning inside the sample, which can greatly reduce the scanning time of the optical spot.

Figure 11:
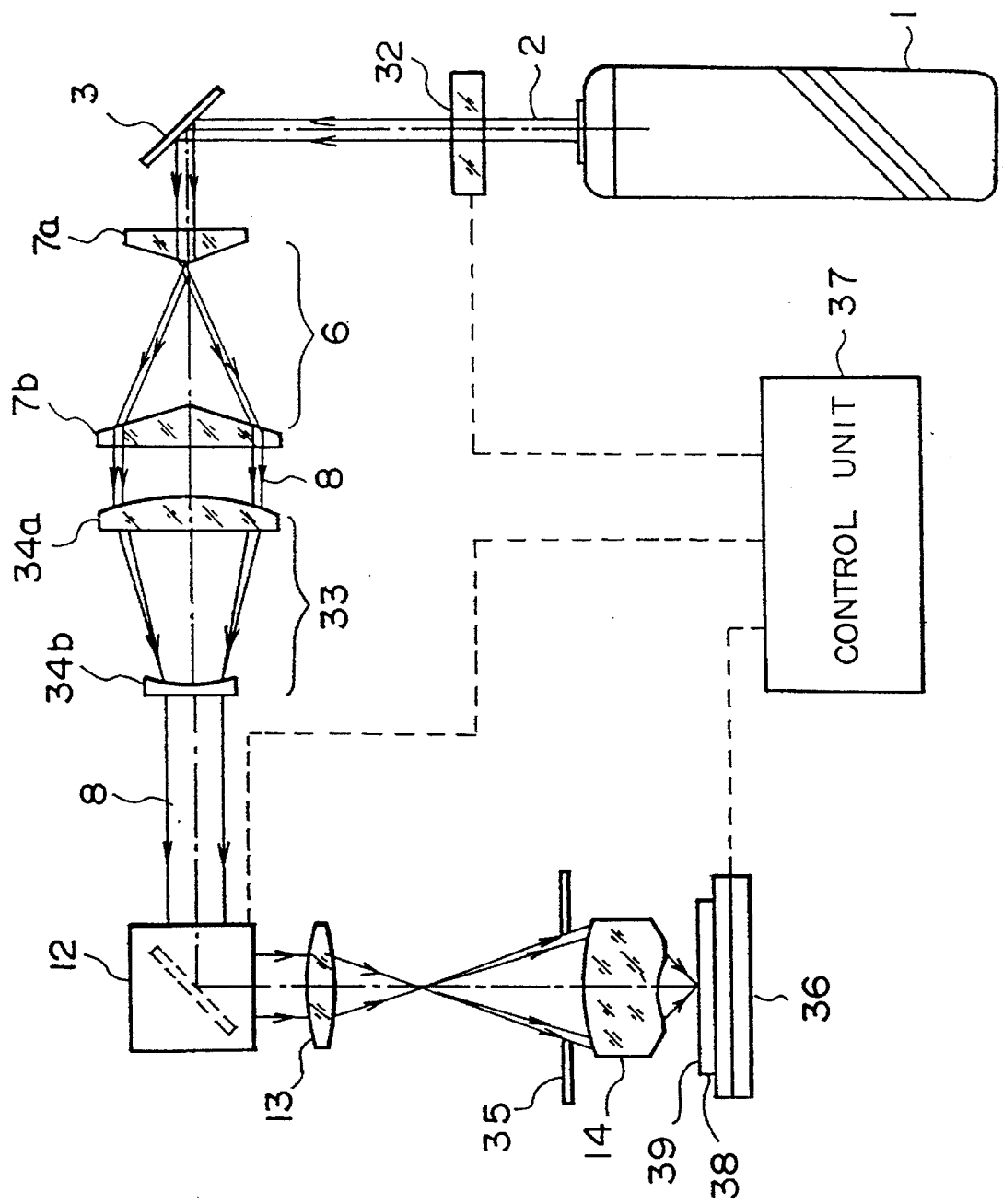
FIG. 11 is a structural drawing to show an embodiment associated with an optical writing apparatus using a laser scanning optical system of the present invention.

FIG. 11 is a structural drawing to show an embodiment concerning an optical writing apparatus using the laser scanning optical system of the present invention. In the optical writing apparatus there are an optical modulator 32 and a plane mirror 3 arranged along the traveling direction of laser beam 2 emitted from a laser 1 (light source). Along the traveling direction of the laser beam 2 reflected by the plane mirror 3 in the direction perpendicular to the optical axis there is an axicon pair (optical converting unit) 6, a beam reducer 33 and an X-Y scanner (optical scanning unit) 12 arranged approximately on a line. Along the traveling direction of the laser beam 2 outgoing from the X-Y scanner 12 in the direction perpendicular to the optical axis, there is an imaging lens 13, an aperture stop 35, an objective lens 14 (optical converging unit) and an X-Y stage 36 arranged approximately on a line. Input terminals of the optical modulator 32, the X-Y scanner 12 and the X-Y stage 36 are electrically connected to associated output terminals of a control unit 37. A substrate 38 coated with a photosensitive agent 39 is set on the X-Y stage 36.

The optical modulator 32 is an optical modulator for modulating the intensity, the frequency, the phase and the plane of polarization of the laser beam 2 incident thereon from the laser 1. Particularly, it selects either one of continuous irradiation and pulse irradiation of the laser beam 2 by the intensity modulation. The beam reducer 33 is composed of a convex lens 34a and a concave lens 34b, which reduces the outer diameter of the laser beam 2 incident as a cylindrical ray bundle 8 thereon from the axicon pair 6 so as to make it coincident with the aperture diameter of objective lens 14. The convex lens 34a and concave lens 34b are so arranged that the optical axes thereof are coincident with each other. It is also preferred that the beam reducer 33 is further composed a concave lens arranged between two convex lenses 34a, 34b as the beam reducer 9 in FIG. 13(c) to variably set the distance between the convex lens 34a and the concave lens by unrepresented moving means of the concave lens. In this arrangement, the convex lenses 34a, 34b and the concave lens respectively function as a focus-lag-correction lens group, a fixed Lens group and a zoom lens group. Therefore a magnification ratio for the diameter of ray bundle of laser beam 2 is continuously changeable or zoomed when the position of the concave lens is changed FIG. 13(b) to FIG. 13(c). The aperture stop 35 is an aperture having a circular opening, which limits the outer diameter of ray bundle of the laser beam 2 incident as the cylindrical ray bundle 8 thereinto from the imaging lens 13. The X-Y stage 36 moves the substrate 38 in a direction conjugate with the scanning direction of laser beam 2 by the X-Y scanner 12. The control unit 37 is a microcomputer or the Like, which sets optical modulation of the laser beam 2 through the optical modulator 32 and which sets scanning speeds and scanning timings of X-Y scanner 12 and X-Y stage 36 in synchronization. The substrate 38 is a wafer made of a semiconductor material or a chip separated out of the wafer, and is located on the rear image plane of objective lens 14. The photosensitive agent 39 is a photoresist or the like, which is subjected to exposure with a high contrast at the position irradiated by the laser beam 2 incident as a Bessel beam thereon from the objective lens 14.

Next described is the operation of the above embodiment concerning the optical writing apparatus.

The laser beam 2 emitted from the laser 1 is optically modulated by the optical modulator 32 and thereafter is reflected by the plane mirror in the direction perpendicular to the optical axis. In the axicon pair 6 the axicon lenses 7a, 7b change the laser beam 2 outgoing from the plane mirror 3 into a beam of parallel rays traveling in parallel with the optical axis, which is a cylindrical ray bundle 8 having an annular cross-sectional intensity perpendicular to the optical axis. Here, the diameter of the cylindrical ray bundle 8 shown by the solid lines can be freely and continuously changed in correspondence with a distance between the axicon prisms 7a, 7b and is so set as to coincide with the aperture diameter of objective lens 14 under an overall magnification including the pupil imaging magnification of imaging lens 13 after the beam has passed through the beam reducer 33.

The beam reducer 33 reduces the diameter of ray bundle of the laser beam 2 outgoing as the cylindrical ray bundle 8 from the axicon pair 6 into a predetermined value while maintaining the traveling direction thereof aligned with the direction of the optical axis. On this occasion the annular zone width is simultaneously compressed in annular cross section perpendicular to the optical axis in the cylindrical ray bundle 8. The X-Y scanner 12 makes the laser beam 2 outgoing from the beam reducer 33 directed in the direction perpendicular to the optical axis and changes the traveling direction of the beam within a predetermined angular range to scan in two orthogonal directions in a plane.

The laser beam 2 outgoing from the X-Y scanner 12 is focused by the imaging lens 13 to form an optical spot on the front image plane of objective lens 14. The optical spot can be said as a virtual light source which can be two-dimensionally deviated by the X-Y scanner 12. For the laser beam 2 outgoing as the cylindrical ray bundle 8 from the optical spot, the aperture stop 35 sets the outer diameter of the ray bundle to a predetermined value and thereafter the laser beam passes only through the peripheral portion of objective lens 14 to go out thereof. It is then irradiated onto the substrate 38 in the form of a Bessel beam as an optical spot converged up to the diffraction limit. The Bessel beam has a diffraction beam intensity distribution composed of a very thin linear center beam having a large intensity in the direction of the optical axis and numerous concentric cylindrical higher-order diffraction beams present around the center beam.

Scanning speeds and scanning timings in synchronization with each other are set for the X-Y scanner 12 and X-Y stage 36 based on a control signal output from the control unit 38. Then the two-dimensional scanning, for example the raster scanning, with the Bessel beam is carried out on the surface of substrate 38 through the X-Y scanner 12 and X-Y stage 36. On the photosensitive agent 39 exposure is effected only in a portion irradiated by the Bessel beam having an optical intensity portion exceeding a certain threshold. Accordingly, various patterns of integrated circuits input in the control unit 37 can De printed on the photosensitive agent 39 on the surface of substrate In such an embodiment of optical writing apparatus as described above, the laser beam passes as the cylindrical ray bundle only through the peripheral portion of the objective lens, whereby the Bessel beam with the thin linear center beam formed to have a large intensity in the direction of the optical axis is irradiated onto the surface of substrate. Thus, the Bessel beam has a Long focal depth, so that exposure can be effected on the photosensitive agent on the substrate irrespective of unevenness of the substrate surface. This can obviate precise alignment of the position of optical spot of the laser beam with the photosensitive agent, improving the efficiency of operation.

The Bessel beam includes the concentric cylindrical peripheral beams around the linear center beam, but they will cause no problem if writing light for the photosensitive agent having a high contrast has only two types of levels of on/off. Thus, the Bessel beam has a high resolution and therefore, with exposure of a pattern of integrated circuits on the photosensitive agent on the substrate, the degree of integration can be increased for the integrated circuits formed based on this pattern.

Figure 12:
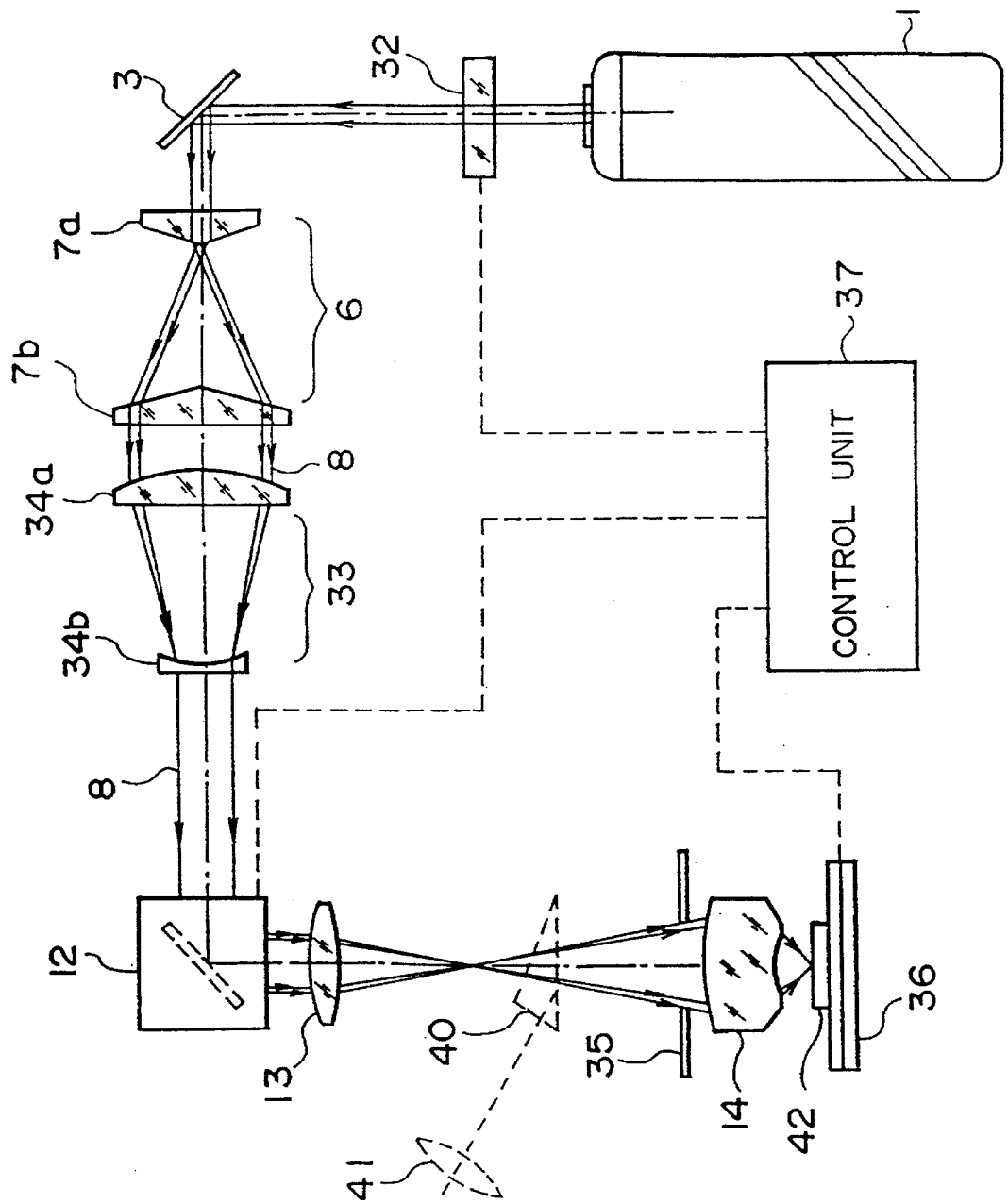
FIG. 12 is a structural drawing to show an embodiment associated with a laser repair apparatus using a laser scanning optical system of the present invention.

FIG. 12 is a structural drawing to snow an embodiment associated with a laser repair apparatus using the laser scanning optical system of the present invention. The present embodiment is constructed almost in the same manner as the above embodiment associated with the optical writing apparatus. However, an IC (Integrated Circuits) chip 42 is set instead of the substrate 38 on the X-Y stage 36. Also, an angular deflection prism 40 is arranged to be interposed by unrepresented moving means in the optical path between the imaging lens 13 and the objective lens 14. In this case, an eyepiece 41 is set along a direction in which a reflection beam from the IC chip 42 is outgoing through the objective lens 14 and the aperture stop 35 from the deflection prism 40.

The deflection prism 40 has a total reflection surface for angular deflection in the direction of 30° or 45° with respect to the optical axis, which reflects light incident thereinto from the IC chip 42 through the objective lens 14 and the aperture stop 35. The eyepiece 41 converges the light incident thereinto from the deflection prism 40 in focus. The IC chip 42 includes integrated circuits on the surface region and is located on the rear image plane of objective lens 14. The integrated circuits in the IC chip 42 include a local defect having been made during fabrication or having occurred in operation.

Next described is the operation of the above embodiment associated with the laser repair apparatus.

The present embodiment is operated almost in the same manner as the above embodiment associated with the optical writing apparatus. However, the outgoing laser beam 2 having passed only through the peripheral portion of objective lens 14 is irradiated onto the IC chip 42 in the form of a Bessel beam as an optical spot converged up to the diffraction limit. The IC chip 42 is etched only in a portion irradiated by the Bessel beam having an optical intensity portion exceeding a predetermined threshold. Then the integrated circuits formed in the IC chip 42 are repaired matching with the various patterns of integrated circuits input in the control unit 37.

In such an embodiment associated with the laser repair apparatus as described above, the laser beam passes as the cylindrical ray bundle only through the peripheral portion of objective lens, whereby the Bessel beam with a thin linear center beam formed with a large intensity in the direction of the optical axis is irradiated onto the surface of substrate. Thus, the Bessel beam has a long focal depth, so that the integrated circuits in the surface region of IC chip can be etched free of influence of unevenness of the integrated circuits themselves. This can obviate precise alignment of the optical spot of laser beam with respect to the substrate of laser beam, improving the efficiency of operation.

The Bessel beam includes the concentric cylindrical peripheral beams around the linear center beam, but the energy of the peripheral beams can be reduced relative to the center beam by adjustment of laser power. The Bessel beam thus has a high resolution, so that a structurally fine defect having occurred in the integrated circuits can be repaired.

The present invention is by no means limited to the above specific embodiments, but can have various modifications.

For example, the above embodiments associated with the fluorescence microscope were so arranged that the dichroic mirror was located in the optical path between the beam compressor and the X-Y scanner. However, the dichroic mirror can be set at any position as long as it is in the optical path between the laser and the X-Y scanner, obtaining the same operational effect as the above embodiments.

Also, the above third embodiment associated with the fluorescence microscope employed three dichroic mirrors. However, any number other than three, of dichroic mirrors may be set as Long as the number of dichroic mirrors corresponds to the number of types of fluorescent dyes applied to the sample, obtaining the same operational effect as in the above embodiments.

As detailed above, the optical converting unit is composed of two axicon prisms in the laser scanning optical system of the present invention. These axicon prisms are so arranged that the apexes thereof are opposed forward or backward to each other at a predetermined distance and the optical axes thereof are coincident with each other, and are made of respective materials having the same index of refraction and shaped with a same apical angle. By this, the laser beam incident as a beam of parallel rays into the optical converting unit has an annular cross-sectional intensity perpendicular to the optical axis and becomes a cylindrical ray bundle as a beam of parallel rays traveling in the direction parallel to the optical axis. Therefore, the laser beam outgoing from the optical converting unit is changed in the traveling direction by the optical scanning unit to be scanned and is then converged by the optical converging unit to become a Bessel beam.

Accordingly, the cylindrical ray bundle is formed without a loss in intensity of laser beam, so that the invention can provide a laser scanning optical system which can perform scanning of the Bessel beam having a high energy utilization factor, a high resolution and a long focal depth.

On the other hand, the laser scanning optical apparatus of the present invention is so arranged that a laser beam emitted from the light source is irradiated onto a certain sample through the laser scanning optical system of the present invention. By this, the sample is scanned with the Bessel beam having a high energy density, a high resolution and a long focal depth.

Here, in the case that the light source oscillates a laser beam of very short time duration pulse, that the sample is labeled with a predetermined fluorescent dye, and that the apparatus is further equipped with an optical detecting unit for detecting fluorescence emitted from the sample based on the multiphoton absorption with irradiation of the Bessel beam, the fluorescence appears only from a position irradiated by the center beam in the Bessel beam based on power adjustment of laser beam, which can prevent false signals from being produced by the higher-order diffraction beams in the Bessel beam. This can improve a resolution of a microscopic image of the sample as obtained by storing output signals from the optical detecting unit as pixel data in synchronization with scanning of laser beam. Also, based on two-dimensional scanning of the Bessel beam, a microscopic image as two-dimensional projection of a three-dimensional image of the sample is obtained as integral values in the thickness direction, which requires no three-dimensional scanning inside the sample and greatly reduces the scanning time of optical spot as compared with the conventional apparatus. In the case that the optical detecting unit is composed of first and second photoelectric detectors for detecting fluorescence emitted from the surface side and from the back side, respectively, of the sample, the fluorescence emitted from the sample reaches the photoelectric detectors with almost no loss, which can enhance the contrast in the microscopic image produced based on addition of output signals from the photoelectric detectors. Therefore, a low-power laser can be used as a light source for emitting the laser beam, which can reduce a damage on an organism sample or another sample.

In the case that the surface of sample is coated with a predetermined photosensitive agent and that a predetermined pattern is formed on the photosensitive agent based on exposure with irradiation of the Bessel beam, exposure on the photosensitive agent on the substrate is effected free of influence of unevenness of substrate surface with the Bessel beam having a long focal depth, which obviates precise alignment of the position of optical spot of laser beam with respect to the photosensitive agent, improving the efficiency of operation. When a pattern of integrated circuits is printed on the photosensitive agent on the substrate with the Bessel beam having a high resolution, the degree of integration can be increased for the integrated circuits formed based on the pattern.

Further, in the case that the surface of sample is exposed to the outside and that the surface region of sample is shaped in a predetermined shape based on excitation with irradiation of the Bessel beam, the surface region of substrate can be etched free of the influence of unevenness of itself by the Bessel beam having a long focal depth, which can obviate precise alignment of the position of optical spot of laser beam with respect to the substrate, improving the efficiency of operation. If the sample is an IC chip having integrated circuits in the surface region, a structurally fine defect occurring in the integrated circuits can be repaired with the Bessel beam having a high resolution.

Accordingly, performing scanning of the Bessel beam having a high energy utilization factor, a high resolution and a long focal depth, the invention can provide a laser scanning optical system as used as a fluorescence microscope, an optical writing apparatus, an integrated circuit repair apparatus, etc.

What is claimed is:

1. A method for obtaining a high resolution three-dimensional microscopic image of a sample having a three-dimensional thickness, comprising the steps of:

emitting a parallel rays pulsed laser beam, said laser beam having a pulse duration of several ten to several hundred fs and a repetitive frequency of several ten to several hundred $MH_z$;

shaping said laser beam into a cylindrical and annular cross-sectional ray bundle, by providing first and second convex axicon prisms which are disposed such that apexes thereof are opposed one to the other and said apexes are separated by a distance one from the other and optical axes thereof are coincident with each other and which are made of respective materials having substantially the same refractive index and shaped with a same apical angle;

causing said laser beam to enter said first prism and then, after passing through said first prism, to enter said second prism; and adjusting a diameter of said ray bundle by adjusting said beam diameter either before said beam enters said first axicon prism or after said beam exits said second axicon prism;

converging said shaped laser beam to produce a Bessel beam;

changing a shape of three-dimensional intensity distribution of said Bessel beam by setting a ratio $\beta$ of an outer diameter $\alpha$ of said ray bundle to an inner diameter $\alpha^1$ (namely $\beta=\alpha/\alpha^1$) by adjusting said distance;

irradiating said sample with said Bessel beam;

detecting fluorescence light emitted by said sample responsive to irradiation by said Bessel beam;

generating output signals corresponding to said detected light; and producing said microscopic image based on said output signals wherein said detecting step comprises the steps of:
   a) first detecting said fluorescence emitted from a surface side of said sample, and
   b) second detecting said fluorescence emitted from a back side of said sample; and wherein producing said microscopic image based on addition of output signals corresponding to said detected fluorescence.

2. A method according to claim 1, wherein said first detecting step is performed by a first photoelectric detector and said second detecting step is performed by a second photoelectric detector.

3. A method for obtaining a high resolution three-dimensional microscopic image of a sample having a three-dimensional thickness, comprising the steps of:

emitting a parallel rays pulsed laser beam, said laser beam having a pulse duration of several ten to several hundred fs and a repetitive frequency of several ten to several hundred $MH_z$;

shaping said laser beam into a cylindrical and annular cross-sectional ray bundle, by providing first and second convex axicon prisms which are disposed such that apexes thereof are opposed one to the other and said apexes are separated by a distance one from the other and optical axes thereof are coincident with each other and which are made of respective materials having substantially the same refractive index and shaped with a same apical angle;

causing said laser beam to enter said first prism and then, after passing through said first prism, to enter said second prism; and adjusting a diameter of said ray bundle by adjusting said beam diameter either before said beam enters said first axicon prism or after said beam exits said second axicon prism;

converging said shaped laser beam to produce a Bessel beam;

changing a shape of three-dimensional intensity distribution of said Bessel beam by setting a ratio $\beta$ of an outer diameter $\alpha$ of said ray bundle to an inner diameter $\alpha^1$ (namely $\beta=\alpha/\alpha^1$) by adjusting said distance;

labeling said sample with a predetermined fluorescent dye;

irradiating said sample with said Bessel beam;

detecting fluorescence light emitted by said sample responsive to irradiation by said Bessel beam;

generating output signals corresponding to said detected light; and producing said microscopic image based on said output signals wherein said detecting step comprises:
   a) first detecting said fluorescence emitted from a surface side of said sample, and
   b) second detecting said fluorescence emitted from a back side of said sample; and wherein producing said microscopic image based on addition of output signals corresponding to said detected fluorescence.

4. A method according to claim 3, wherein said first detecting step is performed by a first photoelectric detector and said second detecting step is performed by a second photoelectric detector.

* * * * *